(No Model.)
E. R. MARKHAM.
LATHE TOOL.
No. 413,950. Patented Oct. 29, 1889.
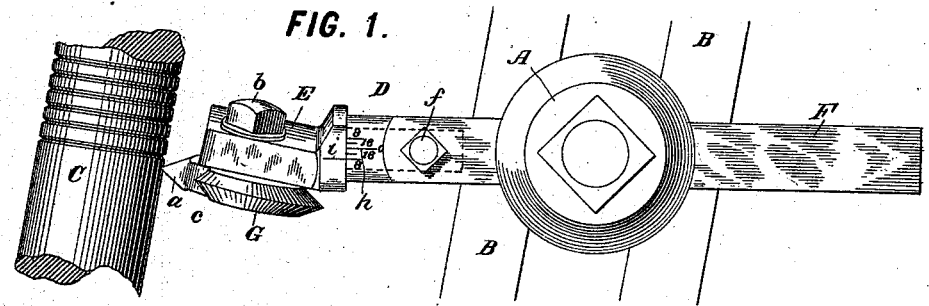
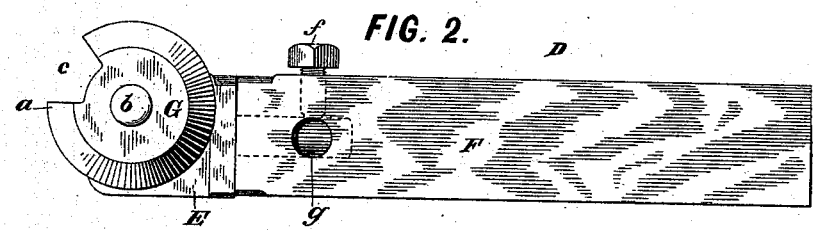
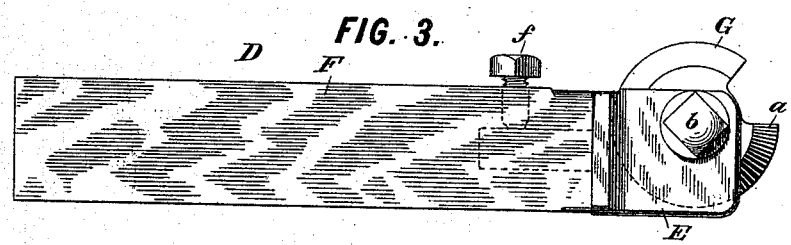
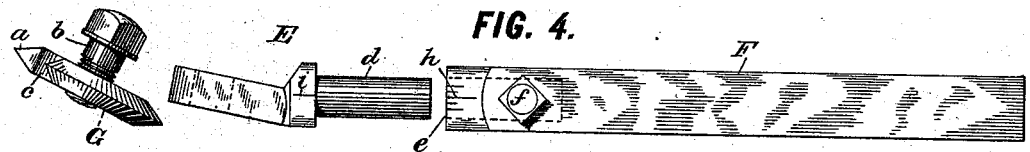
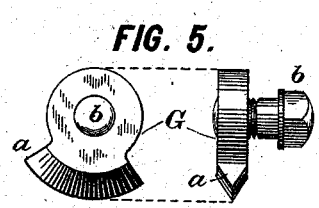
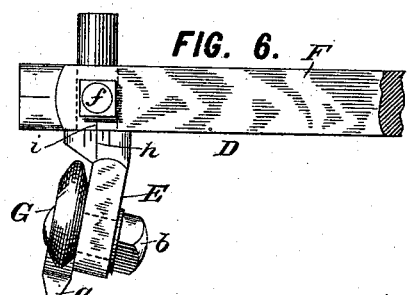
WITNESSES:
J. W. Criswell.
C. K. Fraser.
INVENTOR:
Edward R. Markham
By his Attorneys,
Arthur C. Fraser & Co.

UNITED STATES PATENT OFFICE.

EDWARD R. MARKHAM, OF CHICOPEE FALLS, MASSACHUSETTS, ASSIGNOR TO THE J. STEVENS ARMS AND TOOL COMPANY, OF SAME PLACE.

LATHE-TOOL.

SPECIFICATION forming part of Letters Patent No. 413,950, dated October 29, 1889.

Application filed December 22, 1888. Serial No. 294,425. (No model.)

*To all whom it may concern:*

Be it known that I, EDWARD R. MARKHAM, a citizen of the United States, residing at Chicopee Falls, in the county of Hampden and State of Massachusetts, have invented certain new and useful Improvements in Tools for Lathes, Planers, &c., of which the following is a specification.

This invention relates to tools for cutting or dressing metal and other substances, and especially to tools which are used in lathes, planers, or other analogous machines.

My improved tool is of that class wherein the cutting-edge is adjustable to different angles relatively to the shank by a swiveling motion about an axis extending longitudinally of the shank and without adjusting or canting the shank in the tool post or holder. By my invention this adjustment of pitch may be effected without loosening the cutter or disturbing its attachment to the head of the tool. Means are also provided for determining the relative adjustment of the parts to any conventional angle.

In the accompanying drawings, Figure 1 is a plan of a lathe-tool embodying my invention, showing it held in the tool-post and operating on the work. Fig. 2 is a side elevation of the tool. Fig. 3 is an elevation of the opposite side. Fig. 4 is a plan showing the several parts of the tool detached. Fig. 5 is a side and edge elevation of the circular cutter. Fig. 6 is a plan view of the tool adapted for interior cutting.

Referring to Fig. 1, let A represent the tool part of a lathe; B, the carriage; C, the work to be operated upon, and D my improved tool as a whole.

I will now describe the preferred form of my invention, referring particularly to Figs. 1 to 6, inclusive. The tool D is constructed with a shank of the usual form, which is divided into two sections—a head-section E and a body-section F. The head-section E carries the cutting-edge $a$, which may be formed on the end of this section, or may be a separate cutter. I prefer to use a separate cutter, and have shown a well-known form of disk cutter G, which is fastened to the side of the head-section E by means of a screw or stud $b$, so that the cutter may be adjusted to different angles, or fed up as its cutting-face is ground away. The disk G has a hardened peripheral portion which has in cross-section the shape desired for the cut that is to be made, and a notch $c$ is ground in this peripheral portion in order to form the cutting-face $a$. The remaining peripheral portion serves as a backing for the cutting-edge $a$ and prevents the flaking off of the point. The head-section E is formed with a cylindrical pin or dowel $d$, which pin is inserted into a cylindrical hole or socket $e$ in the end of section F. The pin $d$ fits snugly in the socket $e$, being only free enough to turn therein easily, or to be withdrawn therefrom at will. This dowel and socket constitute a swiveled connection between the two sections of the shank, whereby the head-section may be turned to any desired angle relatively to the body-section. When thus turned, it is important that it be fastened in some rigid manner, and for this purpose I provide a set-screw $f$, turning in a hole tapped into the body-section and bearing against the dowel $d$. The fastening thus provided is entirely independent of that by which the cutter G is fastened to the head-section, so that the adjustment of the cutting-edge to a different angle or pitch may be effected without loosening or disturbing the union of the cutter with the head or altering otherwise its relation to the work. In this respect my invention is an important improvement in adjustable-pitch cutters as heretofore made, in which it was necessary to loosen the cutter before the head-section could be canted.

In cutting work at different feeds it is necessary to cant or pitch the cutting-tool relatively to the work, in order to give its cutting-edge the proper rake and to provide the necessary clearance or bottom rake. The rake varies according to the feed of the work, and also according to the material operated upon in each case. In cutting screw-threads the cant should be equal to the pitch of the thread being cut, so that that part of the cutter immediately below the cutting-edge will not interfere with the thread already cut. Thus in cutting a fine thread the cutter is nearer perpendicular than when a coarse thread or one of steep pitch is being cut. Generally heretofore it has been customary to use specially-shaped or ground tools for cuts of different feeds; but according to my invention it is only necessary to tilt or cant the head-section E on its axis until the proper inclination of the cutting-edge is reached. As the head-section can be tilted in either direction or to any angle, it will be evident that the cutter can be readily adapted for any degree of feed in either direction, or for a straight cut without traverse.

For use in cutting right or left screw-threads of standard sizes, I provide a gage $h$ on one of the sections E or F of the tool and an index-point $i$ on the other, so that the user can set the cutting-edge to the proper inclination without the delay of experimenting or testing to determine the exact position necessary. When the point $i$ is opposite the central line on gage $h$, the cutting-edge stands in a perpendicular position. If it is desired to cut, say, a 16 right-hand thread, the head-section E is tilted to the left until the point $i$ is opposite the point marked "16" on the gage, or if an 8 thread screw is to be cut the head is tilted until the point $i$ is opposite the graduation marked "8" on the gage $h$, thus giving the cutting-edge the proper pitch. For left-hand threads the head-section is tilted to the right. In Fig. 1 the tool is shown as set for cutting a right-hand 8 thread.

For some inside cutting it may be desirable to place the head-section E at right angles to the body-section F. To accomplish this I form an additional hole $g$ transversely through the body-section F under set-screw $f$, as shown in Fig. 2. When desired, the head-section E may be arranged at right angles to the body-section F by placing the pin $d$ through hole $g$, as shown in Fig. 6. When the tool is constructed so that the head-section can be placed either in line with or at right angles to the body-section, I prefer to form the gage $h$ on the head-section E and the index-point $i$ on the body-section F, and an additional index-point $j$ on the side of the body-section to determine the setting when the head-section is placed at the side.

In Fig. 6 I have also shown a cutting-edge having a shape differing from that shown in the other figures, and I have also shown the cutter G placed on the opposite side of head-section E to that on which it is shown in the other figures. To the head-section E may be attached a turning or forming tool of any shape—a V-thread, square thread, or any form of screw-cutting tool used in lathe-work or any known kind or construction of cutting-edge.

Fig. 7 shows a simple form of my invention, wherein the cutting-edge $a$ is formed directly on the head-section E.

My invention is susceptible of various modifications without departing from the essential features thereof. For example, the construction of the swivel-connection between the two sections may be varied, and any suitable clamping-connection for the two sections may be used, or any of the well-known cutters may be applied to the head-section E.

Although I have described my invention as applied to a lathe-tool, it will be apparent that it is applicable to various other tools—as, for example, those used on planers, shapers, &c.

What I claim as my invention is as follows:

1. A cutting-tool consisting of a shank divided into two sections—a body-section and a head-section—swiveled together by being formed the one with a socket and the other with a dowel entering said socket, a cutter carried at all times by the head-section, a fastening for adjustably clamping the cutter thereto irrespective of whether the head-section is secured to the body-section or not, and an independent fastening for clamping the head-section to the body-section after the adjustment of its swivel-joint, said latter fastening between the head and body sections being independent of the fastening between the cutter and the head-section, whereby the cutting-edge may be adjusted to different angles without disturbing the union between the cutter and the head-section, substantially as set forth.

2. The body-section of a cutting-tool, the head-section thereof, a swivel-connection between said head and body sections, whereby said head-section is axially adjustable on said body-section, and a fastening for clamping said sections in the required relative position, in combination with a cutter carried by said head-section and rotatively adjustable thereon, and a fastening for clamping said cutter in the required position on said head-section, said fastening being wholly independent of the fastening between the head and body sections, substantially as set forth.

3. The body-section of a cutting-tool having a socket, a head-section having a dowel entering said socket and capable of turning axially in said socket, and a set-screw for securing said body-section and head-section in the required position, in combination with a cutter carried by said head-section, and a stud securing said cutter to said head-section irrespective of the connection between the head-section and the body-section, on which stud said cutter is rotatively adjustable, substantially as set forth.

4. A cutting-tool consisting of a shank divided into two sections, a body and head section, the body-section formed with a longitudinal socket and an intersecting transverse socket, and the head-section provided with a dowel adapted to fit either of said sockets, and a set-screw screwing into the body-section at the point of intersection of said sockets, whereby the head-section may be swiveled to the body-section on either a longitudinal or transverse axis, and may be fastened in either case by said set-screw.

In witness whereof I have hereunto signed my name in the presence of two subscribing witnesses.

EDWARD R. MARKHAM.

Witnesses:
 JAMES H. LOOMIS,
 FREDERICK M. NICHOLS.